United States Patent [19]

Ward

[11] 4,189,539
[45] Feb. 19, 1980

[54] REACTION PRODUCT OF AN EPOXIDE AND A POLYALKYLENEPOLYAMINE IN BEAD FORM AND A METHOD FOR PREPARING SAME

[75] Inventor: Eldon L. Ward, Angleton, Tex.

[73] Assignee: The Dow Chemical Company, Midland, Mich.

[21] Appl. No.: 919,882

[22] Filed: Jun. 28, 1978

[51] Int. Cl.$^2$ ............................................. C08G 59/02
[52] U.S. Cl. .................... 521/25; 528/121; 528/132; 528/407; 525/417; 525/504; 528/95
[58] Field of Search ............ 528/95, 109, 120, 121, 528/132, 162, 407; 521/25

[56] References Cited

U.S. PATENT DOCUMENTS

| | | | |
|---|---|---|---|
| 2,469,684 | 5/1949 | Dudley | 521/25 |
| 2,610,156 | 9/1952 | Lundberg | 521/25 |
| 2,614,085 | 10/1952 | Lundberg | 521/25 |
| 3,005,786 | 10/1961 | Greer | 521/25 |
| 4,026,831 | 5/1977 | Moriya et al. | 528/113 |

*Primary Examiner*—Joseph L. Schofer
*Assistant Examiner*—Peter F. Kulkosky

[57] ABSTRACT

The reaction product of an epoxide and a polyalkylenepolyamine is prepared in bead form by dispersing a blend of the epoxide and polyalkylenepolyamine in a concentrated aqueous solution of an alkali metal hydroxide and then curing the dispersed blend. For example, dispersing a blend of triethylenetetramine and diglycidyl ether of bisphenol A in an agitated aqueous solution of 50 weight percent NaOH and curing the dispersed blend produces normally solid beads which are useful as a weak base ion exchange resin.

17 Claims, No Drawings

REACTION PRODUCT OF AN EPOXIDE AND A POLYALKYLENEPOLYAMINE IN BEAD FORM AND A METHOD FOR PREPARING SAME

BACKGROUND OF THE INVENTION

This invention relates to reaction products of an epoxide and a polyalkylenepolyamine and to methods for preparing the same.

Polymers derived from a polyalkylenepolyamine and epoxide are known to be excellent weak base ion exchange resins. See, for example, *Ion Exchange*, by F. Helfferich, published in 1962 by McGraw-Hill Book Company, New York. The preparation of these polymers in granular form is well known in the art. See, for example, U.S. Pat. No. 2,469,683 to Dudley and Lundberg wherein an anion active resin is prepared by reacting an alkylene polyamine with a monoepoxide, e.g., epihalohydrin, in water and optionally a small amount of NaOH. The resulting gelled mass of polymer is then ground for use. Similarly, a method for preparing granules of an alkylene polyamine and polyepoxide, i.e., an organic compound containing a plurality of oxiranyl groups is disclosed in U.S. Pat. No. 2,469,684 to Dudley.

In many applications, particularly continuous operations, such resins are advantageously prepared in the form of spheroidal beads. A method for preparing spheroidal weak base ion exchange resin particles of a polyalkylenepolyamine and a monoepoxide is disclosed in U.S. Pat. Nos. 2,614,085 and 2,610,156 to Lundberg wherein an aqueous syrup of a resinous partial condensation product of the polyalkylenepolyamine and monoepoxide is dispersed with mechanical agitation in an organic, non-solvent medium containing a surface active agent. The resulting partially condensed dispersed globules are converted to a water-insoluble resin upon heating. Unfortunately, the beads prepared by this method are of irregular shape and of generally non-uniform sizes. Moreover, the agitation rate used in such a method must be carefully controlled to prevent excessive agglomeration. Furthermore, this method which requires substantial expenditures of time, energy, material and apparatus is not easily practiced in a continuous manner. Finally, spheroidal beads of a polyalkylenepolyamine and polyepoxide cannot be prepared by this method.

Improvements of the aforementioned method are disclosed in U.S. Pat. Nos. 3,005,786 to Greer and 3,725,313 to Naumann, Schon, Schnoring and Pampus. U.S. Pat. No. 3,005,786 teaches using a dispersing agent of chlorinated rubber, chlorosulfonated polyethylene or polyvinylchloride in the organic non-solvent. U.S. Pat. No. 3,725,313 discloses the use of a rubber-like homopolymer or copolymer of a conjugated diolefin or a cycloalkenamers as the dispersing agent in the organic non-solvent. Use of the dispersing agents disclosed in these patents reduces the agglomeration of the beads during cure and provides for a more uniform bead size. Unfortunately, the other stated deficiencies of the aforementioned method of Lundberg are not substantially reduced.

In view of the stated deficiencies of the prior art, it remains highly desirable to provide an improved method for preparing the reaction product of a polyalkylenepolyamine and an epoxide in the form of beads. Moreover, it is particularly desirable to provide a method for making beads of polyalkylenepolyamine/polyepoxide reaction products which have not been prepared heretofore.

SUMMARY OF THE INVENTION

Accordingly, in one aspect, the present invention is such an improved method for preparing a normally solid reaction product of a polyalkylenepolyamine and an epoxide which comprises dispersing a blend of the polyalkylenepolyamine and epoxide in a reaction medium of a concentrated aqueous solution of alkali metal hydroxide and maintaining the dispersed blend at conditions sufficient to cure the blend to discrete, spheroidal beads of the reaction product.

In another aspect, the present invention is the cured reaction product of a polyalkylenepolyamine and a polyepoxide in the form of normally solid, discrete, spheroidal beads.

Surprisingly, a blend of the polyalkylenepolyamine and epoxide disperses in the aqueous solution of a concentrated alkali metal hydroxide as droplets which can be subsequently cured to form beads. The cured beads are easily removed by filtration at a high yield based on the weight of the original reactant blend. The cured beads thus formed are of approximate uniform size, generally spherical and unbroken, e.g., not cracked or spalled.

The cured beads made in accordance with this method are useful as weak base ion exchange resins for removing electrolytes from water in operations such as desalting, dimineralization and other purification processes. They are also useful for the removal of undesired components from liquids in such fields as medicine, food processing and electroplating. Moreover, the beads are suitably employed as reactive fillers for epoxy resins, urethane resins, polyamide resins and the like. Smaller beads, e.g., 10–100 microns, are also useful as the amine hardener of epoxy powder coating formulations.

DETAILED DESCRIPTION OF THE INVENTION

Epoxides suitably employed in the practice of this invention are polyfunctional epoxides which contain sufficient reactive functional groups to form a cross-linked network when reacted with a polyalkylenepolyamine, as hereinafter described, in accordance with the method of this invention. Polyfunctional epoxides suitably employed include polyepoxides, i.e., epoxides which contain two or more oxiranyl functional groups

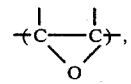

and monoepoxides, i.e., epoxides which contain one oxiranyl functional group and one other reactive functional group as hereinafter described.

Representative monoepoxides include organic compounds having an α-halo-β,γ-epoxy arrangement, such as epihalohydrin, 1,2-epoxy-2-methyl-3-halopropane, 1,2-epoxy-3-methyl-3-halopropane and the like, wherein the other reactive functional group is a halogen radical such as Cl- or Br-, and ethylencially unsaturated organic compounds such as 3,4-epoxy-1-butene wherein the other reactive functional group is an alkenyl group.

Representative polyepoxides advantageously employed in this invention are the polyepoxides of aliphatic, alicyclic and aromatic hydrocarbons and combinations thereof. The term "aliphatic, alicyclic and aromatic hydrocarbons" includes inertly substituted aliphatic, alicyclic and aromatic hydrocarbons. By the term "inertly substituted hydrocarbon" is meant a hydrocarbon having one or more substituent groups, such group(s) being inert to the polymerization and cross-linking of the polyepoxide. Polyepoxides of aliphatic, alicyclic and aromatic hydrocarbons are well known in the art, and reference is made thereto for the purposes of this invention. Illustrative examples of such polyepoxides are shown in the Handbook of Epoxy Resins, by H. Lee and K. Neville published in 1967 by McGraw-Hill, New York, in Appendix 4-1, pages 4-35 through 4-56. Of particular interest in this invention are diglycidyl phenyl ether, epoxidized butadiene, limonene dioxide, bisepoxy dicyclopentyl ether of ethylene glycol, 1,2-epoxy-6-(2,3-epoxypropoxy)hexahydro-4,7-methanoidane; and the polyepoxides having two or more

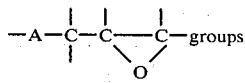

wherein each —A— is independently an electron donating substituent such as

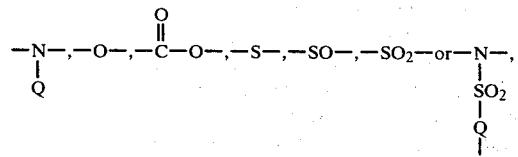

or a covalent bond and Q is an alkyl, alicyclic or aromatic hydrocarbon. Representative examples of the aforementioned polyepoxides include triglycidyl-p-aminophenol; o-glycidyl phenyl glycidyl ether; 2,6-(2,3-epoxypropyl)phenyl glycidyl ether; triglycidyl 4,4-bis(4-hydroxyphenyl)pentanoic acid; polyglycidyl ethers such as the diglycidyl ether of butanediol, bisphenol A, bisphenol F, bisphenol S, ethylene glycol, propylene glycol, polyethylene glycol, polypropylene glycol, glycerol, dioxanediol, and water initiated polymerized epihalohydrin; the triglycidyl ether of glycol and the polyglycidyl ether of poly-o-cresol formaldehyde, polyphenol-formaldehyde, polybutadiene and the like; and polyglycidyl esters such as diglycidyl isophthalate, diglycidyl phthalate, and the like. As used herein, the term "polyepoxide" is intended to include mixtures of one or more suitable polyepoxide with small amounts of one or more suitable monoepoxide. Advantageously, such amounts of monoepoxide are less than about 40 weight percent, preferably less than about 25 weight percent, most preferably less than about 10 weight percent based on the total weight of the mixture.

Preferred epoxides include the epihalohydrins and the aromatic based polyepoxides, i.e., those having one or more aromatic constituents. Especially preferred are epichlorohydrin; diglycidyl ether of bisphenol A and bisphenol F; and the polyglycidyl ether of polyphenol-formaldehyde.

Mixtures of monoepoxides, polyepoxides and combinations thereof are also suitably employed in the practice of this invention. Such mixtures are intended to be included within the term "epoxide".

Polyalkylenepolyamines suitably employed in the practice of this invention include polyamines of aliphatic, alicyclic and aromatic hydrocarbons and inertly substituted aliphatic, alicyclic and aromatic hydrocarbons which have sufficient reactive functional groups to form a cross-linked network when reacted in accordance with the methods of the present invention with a suitable epoxide as hereinbefore described. Typically, functionality is the number of hydrogen atoms attached directly to the nitrogen atoms of the polyalkylenepolyamine which are capable of reacting with the epoxide such that polymerization and subsequent cross-linking can occur. Generally, when three or more of such amino hydrogens are present, the polyalkylenepolyamine is suitably employed in this invention. Representative examples of polyalkylenepolyamines suitably employed in the practice of this invention include polymethylenediamines such as ethylenediamine, 1,6-hexane-diamine and 1,3-propanediamine; polyetherdiamines; diethylenetriamine; iminobispropylamine; bis-(hexamethylene)triamine; triethylenetetraamine; tetraethylenepentaamine; pentaethylenehexaamine; aminoethylethanolamine; methyliminobispropylamine; dimethylaminopropylamine; diethylaminopropylamine; methanediamine; bis(2-aminoethyl)sulfide; N-aminoethylpiperazine; 1,3-diaminocyclohexane; isophoronediamine; m-xylylenediamine; tetrachloro-p-xylenediamine; 1,4-bis-(2-aminoethyl)piperazine; piperazine and the like and combinations thereof. Polyalkyleneimines are also suitably employed in the practice of this invention. Representative examples of polyalkyleneimines include polyethyleneimine, polypropyleneimine and the like. Preferred polyalkylenepolyamines include ethylenediamine; diethylenetriamine; triethylenetetraamine; 1,3-propanediamine; bis(2-aminoethyl)sulfide; 1,6-hexanediamine; and polyethyleneimine, with triethylenetetraamine and diethylenetriamine being especially preferred.

The proportions at which the reactants, i.e., the polyalkylenepolyamine and epoxide, are employed are not critical, provided that a dispersed blend of said reactants in the reaction medium as hereinafter defined contain sufficient of each reactive functionality for polymerization and cross-linking to a degree sufficient to form normally solid, discrete, spheroidal beads. Typically, a reactant ratio (expressed as the number of epoxy equivalents to the number of amino hydrogen equivalents) from about 0.1:1 to about 1:1 contains sufficient functionality for polymerization and cross-linking to form such beads. Advantageously, a reactant ratio from about 0.2:1 to about 0.8:1 is employed. For the purposes of this invention, epoxy equivalent is the number of reactive functional groups per molecule of the epoxide wherein the reactive functional groups include the oxiranyl functional groups and the other reactive functional groups as hereinbefore described. Amino hydrogen equivalent is the number of reactive hydrogen atoms bonded to the nitrogen atoms of one molecule of the polyalkylenepolyamine. In the practice of this invention, the reactants are advantageously employed in a molar ratio (expressed as the moles of epoxide to moles of polyalkylenepolyamine) from about 0.1:1 to about 3:1, preferably from about 0.1:1 to about 1.5:1, more preferably from about 0.1:1 to about 1.2:1.

The reaction medium employed in the practice of this invention comprises a concentrated aqueous solution of an alkali metal hydroxide and optionally a suspending agent. Alkali metal hydroxides suitably employed in the practice of this invention include sodium, potassium and lithim hydroxides or combinations thereof. While cesium, rubidium and francium hydroxide are operable, their expense and limited availability make their use impractical in this invention.

In the practice of this invention, the alkali metal hydroxide is dissolved in water at an amount sufficient to cause a blend of the reactants, i.e., the polyalkylenepolyamine and epoxide, in their desired proportions to become substantially insoluble in the resulting aqueous solution. This concentration will vary depending on the composition of the polyalkylenepolyamine, epoxide and the alkali metal hydroxide employed. In general, minimum concentrations of about 40 weight percent of alkali metal hydroxide based on the total weight of alkali metal hydroxide and water are suitably employed. Preferably, a minimum concentration of at least 50 weight percent based on the total weight of alkali metal hydroxide and water is employed.

Optionally, the reaction medium also contains a suspending agent therein. Suspending agents suitably employed in the practice of this invention are anionic or non-ionic compounds which reduce agglomeration of the dispersed blend. Advantageously, the suspending agent is soluble or uniformly dispersible in the concentrated aqueous solution of the alkali metal hydroxide. Representative examples of suspending agents useful in the practice of this invention include hydroxyalkyl cellulose such as hydroxypropyl methylcellulose; hydroxyethyl cellulose and ethyl hydroxyethyl cellulose; carboxylated methylcellulose, carboxymethylated methyl cellulose; modified starches such as white dextrin and canary dextrin; and xanthum gum. Suspending agents which have been found to be particularly useful include methylcellulose having a methoxy degree of substitution (M.D.S.) from about 1.5 to about 2.0 and a viscosity at 20° C. in a 2 percent by weight aqueous solution of below about 5600 cps; hydroxypropyl methylcellulose having a M.D.S. from about 1.0 to about 1.6 and hydroxypropyl D.S. of from about 0.1 to 0.30 and a viscosity at 20° C. in a 2 percent by weight aqueous solution of below about 1500 cps, and carboxymethylated methylcellulose having a M.D.S. between about 0.5 to about 2.5, a carboxymethylated degree of substitution (CMC D.S.) between about 0.1 and about 0.7 and a viscosity in a 2 percent aqueous solution of 20° C. of less than about several hundred. Other suspending agents useful herein are readily determined by the experimental test methods presented in Examples 21–30.

The effectiveness of the suspending agent depends upon its composition, its concentration, the proportions and type of each reactant employed, the reaction conditions and the droplet size desired. Advantageously, an amount sufficient to reduce the agglomeration of the dispersed blend in the reaction medium is employed. Typically, in many applications, concentrations from about 0.01 to about 5 weight percent based on the total weight of the reactants in the reaction medium are effectively employed.

In the practice of this invention, the polyalkylenepolyamine and epoxide are advantageously blended at their desired proportions prior to being dispersed in the reaction medium. Such a blend is preferably neat, i.e., contains nothing other than the reactants. Alternatively, the reactants are added separately to the reaction medium in their desired proportions. The additions of the reactants to the reaction medium may be continuous, batchwise, or intermittent. The point of addition of the reactants to the reaction medium is not critical, although sub-surface addition is preferred to surface addition.

Preferably, the volume percent of the disperse blend, i.e., the polyalkylenepolyamine and epoxide, in the reaction medium is such that the volume ratio of the disperse blend expressed as the ratio of the volume of the reaction medium to the volume of the initial reactants is from about 1:1 to about 15:1. Advantageously, the higher percentages of the disperse blend, e.g., volume ratio from about 1:1 to about 5:1, are employed when a suspending agent is employed. When no suspending agent is employed, lower percentages of the disperse blend, e.g., volume ratios from about 6:1 to about 15:1, are advantageously employed.

The temperature of the aqueous alkali metal hydroxide solution during the addition of the reactants is advantageously a temperature such that the droplets comprising the reactant blend are polymerized and partially cured within a relatively short time following their addition. Generally, a time of less than about 10 minutes, more preferably, less than about 2 minutes, is desired to achieve partial cure. By the term "partial cure" is meant that the droplets are cured in bead form, i.e., the droplets of the reactant blend are sufficiently solid to remain discrete and retain their spheroidal shape upon their separation from the reaction medium by physical means such as filtration. Initial reaction temperatures suitably employed are dependent upon the amounts of the polyalkylenepolyamine and epoxide employed, the relative reactivity of the reactants, and the suspending agent employed. Typically, temperatures between about 50° to about 135° C. are advantageously employed. The lower temperatures, e.g., about 50° to about 90° C., are generally preferred when a suspending agent is employed. When no suspending agent is employed, the higher temperatures, e.g., about 70° to about 135° C., are preferred to provide a faster cure which prevents excessive agglomeration of the particles prior to their cure into hard resin beads.

The partially cured beads are advantageously maintained in the aqueous solution and at elevated temperatures, e.g., about 50° to about 135° C., for an additional reaction period sufficient to insure cure is complete. The length of this additional reaction period is dependent upon the proportion and type of each reactant employed, the reaction temperature and the size of each individual droplet. Typically, additional reaction periods from about 0.5 to about 3 hours are sufficient to complete the cure. In many cases, the temperature of this additional cure is advantageously the initial reaction temperature. However, when the initial reaction temperature is low, e.g., about 50° C. to about 90° C., the temperature of the aqueous solution is advantageously increased, e.g., to a temperature from about 70° C. to about 135° C. following the partial cure of all the droplets in the aqueous solution. Employment of a low initial reaction temperature with a subsequent increase in temperature is particularly advantageous when using a suspending agent in the reaction medium.

The reaction medium is advantageously agitated during all stages of the reaction, e.g., addition of the reactants, partial cure and completion of the cure. The rate and type of agitation are not critical to the practice of this invention provided the agitation is sufficient to (1) form droplets of the reactant blend upon the reactant's introduction to the aqueous solution and (2) disperse the resulting droplets in the reaction medium.

The droplet size and the size of the subsequently formed beads are advantageously controlled and are desirably uniform for any reaction product. Droplet size is primarily determined by the rate and type of agitation and by the concentration and type of the suspending agent employed. In a typical operation, e.g., one using about 0.3 to about 1 weight percent of a suspending agent based on the total weight of reactants and agitation similar to that of Example 21, beads range in size primarily from about 0.07 to about 4 mm. Typically, smaller droplets, e.g., as small as about 5 microns, are formed at higher rates of agitation and at greater concentrations of the suspending agent, while larger size droplets, e.g., above 4 mm, are formed at lower agitation rates and smaller concentrations of the suspending agent. Obtainable droplet sizes and the sizes of the subsequently cured beads are easily determined by experimentation.

Following the preparations of the cured beads, the beads are easily separated from the aqueous solution by conventional filtration techniques. Following filtration, the recovered beads are advantageously washed to remove any excess alkali metal hydroxide which may be present. The beads are then advantageously dried, yielding a hard resin bead.

The preparation of the reaction product of a polyalkylenepolyamine and epoxide in the above-described manner is easily adapted to batch, semi-batch and continuous operations as exemplified hereinafter. The following examples are set forth to illustrate the invention in various modes of operation and should not be construed to limit its scope. In the examples, all parts and percentages are by weight unless otherwise indicated.

EXAMPLE 1

To a round bottom 5 l. flask equipped with a stirrer, thermometer, heating and cooling means and addition funnel is added 2500 ml. of a 50 percent aqueous solution of sodium hydroxide. The flask is heated with agitation to 110° C. To the heated flask is added a blend of 73 g. of triethylenetetraamine and 176.5 g. of diglycidyl ether bisphenol A having an epoxy equivalent of 172–176. The blend quickly disperses into small droplets upon its addition to the aqueous sodium hydroxide. Stirring of the mixture is continued for one hour. The mixture is then cooled to room temperature and the beads collected by filtration.

The collected beads are washed free of sodium hydroxide, swelled in an aqueous solution of 5 percent hydrochloric acid, returned to the base form with an aqueous solution of 4 percent sodium hydroxide and then are washed with water until neutral. At this point, the water-swelled beads weigh 388 grams. Ten grams of the beads are dried, yielding 6.1 grams of dried beads, i.e., the swollen beads contain 39 percent water. This is equivalent to a 95 percent yield based on the total weight of the reactants, i.e., triethylenetetraamine and diglycidyl ether of bisphenol A. Examination of the dried beads shows the beads as clear, unbroken spheres having the following size distribution:

| Diameter, mm. | Volume % of Beads |
| --- | --- |
| Larger than 1.68 | 2.6 |
| 0.84–1.67 | 16.4 |
| 0.30–0.83 | 70.4 |
| 0.21–0.29 | 6.3 |
| 0.10–0.20 | 4.3 |

The beads have an excellent total weak base capacity for hydrochloric acid of 2.2 milliequivalents per milliliter which is equivalent to 48.1 kilograins of calcium carbonate ($CaCO_3$) per cubic foot. The standard operating capacity is determined by standard methods to be 27 kilograins of $CaCO_3$ per cubic foot of cured beads. Thus, the beads are highly effective as weak base ion exhange resins.

EXAMPLE 2

The continuous preparation of cured beads is achieved using a vertically mounted glass pipe column (7 ft. length ×2 in. inside diameter) which is fitted with a paddle stirrer which is disposed longitudinally in the column. The stirrer comprises a shaft having several blades rigidly mounted thereon at a uniform distance from each other. The paddle stirrer shaft is connected at the bottom of the column through a mechanical seal to a variable speed motor. The column is filled with an aqueous solution of 50 weight percent sodium hydroxide. The aqueous caustic solution is heated to 110° C. to 120° C. by a heating tape wrapped around the entire length of the column.

A constant feed stream of 14.2 g. per minute of diglycidyl ether of bisphenol A and a second constant feed stream of 5.9 g. per minute of triethylenetetraamine are pumped through a static mixer (1 ft. length by 0.25 in. inside diameter) having 21 elements. The mixer blends the reactants into a homogeneous mixture. This mixture is fed into the bottom of the column through a small diameter stainless steel tube into the aqueous sodium hydroxide solution. The stirrer breaks up the stream into small uniform droplets which slowly rise to the top of the column where they are removed by an overflow device. The beads collected are hard, spheroidal, show no evidence of cracking and of a size distribution similar to the beads prepared in Example 1.

EXAMPLE 3

In a manner similar to Example 1, a blend of 32.8 g. of epichlorohydrin and 17.2 g. of triethylenetetraamine is added to 500 gm of the reaction medium of Example 1 which is at a temperature of 70° C. The beads formed are hard, spheroidal and contain 46 percent water in free base form. The beads have an excellent total weak base capacity for hydrochloric acid of 3.1 milliequivalents per milliliter (meq./ml.).

EXAMPLES 4–20

In a manner similar to Example 1, the various epoxides and polyalkylenepolyamines are reacted in the proportions and at reaction temperatures as specified in the following table to form cured beads.

TABLE I

| Example No. | Epoxide(1) | Amine(2) | °C. Temp. | Mole Ratio Epoxide/Amine | Wt. % $H_2O$ of Bead(3) |
| --- | --- | --- | --- | --- | --- |
| 4 | DGEBPA | PEI-6 | 110 | 2/1 | 50 |

TABLE I-continued

| Example No. | Epoxide(1) | Amine(2) | °C. Temp. | Mole Ratio Epoxide/Amine | Wt. % H₂O of Bead(3) |
|---|---|---|---|---|---|
| 5 | DGEPG | TETA | " | 2/1 | 57 |
| 6 | PGE P/F | " | " | 1/1 | 39 |
| 7 | PGE 1.2/1 MEK | " | 70 | 0.42/1 | 37.8 |
| 8 | PGE P/F | " | 110 | 0.38/1 | 42 |
| 9 | " | " | " | 0.32/1 | 46.5 |
| 10 | " | DETA | " | 0.35/1 | 27 |
| 11 | DGEBPA | " | " | 1/1 | 14.7 |
| 12 | " | Bis(2-amino ethyl)sulfide | " | 1/1 | 21.7 |
| 13 | 50% DGEBPA 50% PGEPG | TETA | " | 1/1 | 55 |
| 14 | DGEBPA | " | " | 2/1 | 6 |
| 15 | " | " | " | 3/1 | <2 |
| 16 | DGEBPA | TETA | 110 | 0.83/1 | 35 |
| 17 | " | " | " | 1.2/1 | 26 |
| 18 | EPI | " | 70 | 2.2/1 | 41 |
| 19 | DGEPG | " | 110 | 1/1 | 96 |
| 20* | DGEBPA | " | " | 1/1 | 45 |

*Example 20 was run using an aqueous solution of 65 percent potassium hydroxide in place of the sodium hydroxide solution.
(1)DGEBPA = diglycidyl ether of bisphenol A with an epoxy equivalent weight of 172-176;
DGEPG = diglycidyl ether of propylene glycol with an average of 4 propylene glycol oxide moieties and an epoxy equivalent weight of 175-205;
PGE P/F = polyglycidyl ether of a phenol A-formaldehyde novolac with an epoxy equivalentweight of 172-181;
PGE P/F MEK = polyglycidyl ether of a phenol A-formaldehyde novolac with an epoxy equivalentof 172-181 dissolved in 15 weight percent methylethyl ketone based on the total weight of the solution to reduce viscosity;
EPI = epichlorohydrin
PGE P/F and PGE P/F MEK were heated to 60° C. prior to their addition to the aqueous solutionof 50 percent sodium hydroxide.
(2)PEI-6 = polyethyleneimine, anhydrous, having a molecular weight of 600;
TETA = triethylenetetraamine;
DETA = diethylenetriamine.
(3)Weight percent of water in the washed beads based on the total weight of the bead and water.

As evidenced by the foregoing table, the methods of this invention are applicable for a wide variety of epoxides and polyalkylenepolyamines over a wide range of mole ratios of reactants.

EXAMPLE 21

To a 5 l. flask equipped with a thermometer, constant torque agitator, rpm readout, heating and cooling means is added 3000 ml. of water. Both the heating and cooling means are connected to a temperature control device. To the water in the flask is added 3150 g. of sodium hydroxide pellets which are dissolved with agitation at about 270 rpm. To the sodium hydroxide solution is added 158 g. of an aqueous solution having dissolved therein 8.2 g. of a carboxymethylated methylcellulose having a M.D.S. of 0.92, CMC D.S. of 0.26, 35 percent active solids and a viscosity of 50 cps (2 percent aqueous solution at 20° C.). The resulting solution is heated to 75° C.

A 500 ml. addition funnel equipped with a polyethylene tube for sub-surface feeding is attached to the flask. A reactant blend consisting of 739 g. of diglycidyl ether of bisphenol A and 311 g. of triethylenetetraamine is prepared. The blend was continuously added through the addition funnel over a period of one hour. Agitation during this period is maintained at 270 rpm and temperature at 75° C. After the entire reactant blend is added, the temperature of the flask is increased to 100° C. and maintained for one hour assuring the beads are cured.

The flask is then cooled and the beads collected by filtration. The beads thus collected are washed free of sodium hydroxide and are then treated with an aqueous solution of 5 percent hydrochloric acid to place them in a swollen state. The swollen beads have the following uniform bead size distribution:

| Diameter, mm. | Volume % of Beads |
|---|---|
| 0.84–1.19 | 1.8 |
| 0.59–0.83 | 29.7 |
| 0.50–0.58 | 20.0 |
| 0.42–0.49 | 15.5 |
| 0.30–0.41 | 23.2 |
| 0.15–0.29 | 8.6 |
| 0.074–0.14 | 1.2 |

When viewed under a microscope, the beads are found to be unbroken, spheroidal and show no signs of coalescence or agglomeration. A portion of the beads are neutralized with an aqueous solution of 4 percent sodium hydroxide to the free base form yielding a bead having 32.4 percent water.

EXAMPLE 22

To a 200 ml. beaker equipped with a thermometer, magnetic stirrer bar and drive means, and a temperature control device is placed 150 g. of an aqueous solution of 50 percent sodium hydroxide. To the sodium hydroxide solution is added 10 ml. of an aqueous solution containing 5 percent (0.2 g.) of a suspending agent. The suspending agent of this example is a carboxymethylated methylcellulose having a M.D.S. of 0.93, a CMS D.S. of 0.12, 40 percent active solids and a viscosity as a 2 percent aqueous solution at 20° C. of 40 cps. This mixture is heated to 50°-60° C.

A reactant blend of 18 g. of diglycidyl ether of bisphenol A and 7.5 g. of triethylenetetraamine is added to the beaker with agitation. The beaker is then heated to 70°-75° C. for one hour. Beads are formed from the reactant blend which are unbroken, spheroidal, show no signs of agglomeration or coalescence and have a size distribution similar to the beads prepared in Example 20.

EXAMPLES 23–29

In a manner similar to the procedure outlined in Example 22, various suspending agents are employed in the concentrations as specified in Table II.

TABLE II

| Example No. | Suspending Agent(1) | Concentration,(2) g. | Dispersion Appearance (3) | Bead Appearance (4) |
|---|---|---|---|---|
| 23 | CMMC-17 | 0.2 | Excellent | Excellent |
| 24 | CMMC-57 | 0.1 | Excellent | Excellent |
| 25 | HPMC-3 | 0.1 | Good | Excellent |
| 26 | HPMC-150C | 0.1 | Good | Excellent |
| 27 | CP-8003 | 0.2 | Excellent | Excellent |
| 28 | CP-8071 | 0.2 | Excellent | Excellent |
| 29 | CP-7071 | 0.2 | Excellent | Excellent |

(1)CMMC-17 = carboxymethylated methylcellulose with a M.D.S. of 0.86, a CMC D.S. of 0.17, with 37.5 percent active solids and a viscosity in a 2 percent aqueous solution (2 percent viscosity) of 17 cps;
CMMC-57 = carboxymethylated methylcellulose with a M.D.S. of 2.0, a CMC D.S. of 0.125, 100 percent active solids and a 2 percent viscosity of 57 cps;
HPMC-3 = hydroxypropyl methylcellulose with a M.D.S. of 1.12–1.56, a hydroxypropyl D.S. of 0.10–0.29 and a 2 percent viscosity of 3 cps;
HPMC-150C = hydroxypropyl methylcellulose with a M.D.S. of 1.12–1.56, a hydroxypropyl D.S. of 0.10–0.29 and a 2 percent viscosity of 15,000 cps;
CP-8003 = a canary dextrin, i.e., a corn starch made 100 percent water soluble by hydrochloric acid hydrolysis having a viscosity of 3000 cps as a 50 weight percent solution in water sold by Corn Products;
CP-8071 = same as CP-8003 except having a viscosity of 3000 cps as a 57 weight percent solution in water;
CP-7071 = a white dextrin of 96 percent water-solubility having a viscosity of 3000 cps as a 55 weight percent solution in water sold by Corn Products.
(2)Concentration is expressed in grams of active suspending agent per 25.5 g. of the total weight of reactants added to the reaction medium.
(3)The dispersion appearance is a rating of the mixture of the suspending agent and the aqueous solution of 50 percent sodium hydroxide. A rating of excellent indicates an excellent dispersion, generally homogeneous with no precipitation or gelation of the suspending agent. A rating of good indicates some precipitation generally as fine fiber-like material but otherwise a good dispersion.
(4)Bead appearance is a rating of the hardness, shape, integrity and the degree of agglomeration and coalescence of the beads. A rating of excellent indicates the beads are generally hard, spherical, unbroken and show little or no agglomeration or coalescence.

As evidenced by the foregoing table, cured beads showing little or no agglomeration are easily prepared using various suspending agents.

EXAMPLE 30

Into a Waring blendor is charged 750 g. of an aqueous solution of 50 percent sodium hydroxide. While agitating the solution at a high speed setting, 20 ml. of an aqueous solution containing 5 percent of the suspending agent used in Example 27 is added. After agitating for several minutes, a blend of 142 g. diglycidyl ether of bisphenol A and 58 g. of triethylenetetraamine is added to the blendor. The temperature of the mixture rises. At about 120° C. the agitation is stopped and the product allowed to cool. On standing, the beads rise to the top of the blendor, leaving a clear sodium hydroxide lower layer. The beads are collected by filtration.

Analysis of the beads show them to be spheroidal, unbroken and having a size in the range of from about 10 to about 100 microns.

What is claimed is:

1. A method for preparing a normally solid reaction product of a polyamine of an aliphatic, alicyclic or aromatic hydrocarbon or an inertly substituted aliphatic, alicyclic or aromatic hydrocarbon having three or more reactive amino hydrogens and a polyfunctional epoxide, in the form of beads, the method comprising the steps of (1) dispersing a blend of the polyamine and the polyfunctional epoxide in a reaction medium of a concentrated aqueous solution of alkali metal hydroxide and (2) maintaining the dispersed blend at conditions sufficient to cure the blend to discrete, spheroidal beads of the reaction product.

2. The method of claim 1 wherein the reaction medium further comprises an amount of suspending agent sufficient to reduce agglomeration of the dispersed blend.

3. The method of claim 1 wherein the reaction medium is at a temperature of between about 50° C. and 135° C.

4. The method of claim 1 wherein the reactant ratio of the polyamine and the polyfunctional epoxide is from about 0.1:1 to about 1:1.

5. The method of claim 1 wherein the volume of the reaction medium is from about 1 to about 15 times the volume of the blend of polyamine and polyfunctional epoxide.

6. The method of claim 1 wherein the alkali metal hydroxide is sodium hydroxide, lithium hydroxide or potassium hydroxide, and the reaction medium comprises at least 40 weight percent of the alkali metal hydroxide based on the total weight of the alkali metal hydroxide and the water.

7. The method of claim 2 wherein the reaction medium is at an initial reaction temperature from about 50° to about 90° C. and following partial cure of the dispersed blend the temperature of the reaction medium is increased to from about 70° to about 135° C.

8. The method of claim 2 wherein the volume of the reaction medium to the volume of the dispersed blend is from about 1:1 to about 5:1.

9. The method of claim 2 wherein the reaction medium comprises from about 0.01 to about 5 weight percent of the suspending agent based on the total weight of the polyamine and polyfunctional epoxide in the reaction medium.

10. The method of claim 2 wherein the suspending agent is a hydroxyalkyl cellulose, carboxylated methylcellulose, carboxymethylated methylcellulose, white dextrin or canary dextrin.

11. The method of claim 9 wherein the polyfunctional epoxide is an epoxide containing sufficient reactive functional groups to form a cross-linked network when reacted with the polyamide and the reactant ratio of the polyfunctional epoxide and the polyamine is from about 0.1:1 to about 1:1, the alkali metal hydroxide is sodium hydroxide or potassium hydroxide, the reaction medium comprises at least 50 weight percent of the alkali metal hydroxide based on the total weight of the alkali metal hydroxide and water, the reaction medium is at an initial reaction temperature from about 50° to about 90° C. and following the partial cure of the dispersed blend the temperature of the reaction medium is increased to from about 70° to about 135° C.

12. The method of claim 1 wherein the polyfunctional epoxide is diglycidyl ether of bisphenol A or bisphenol F; or a polyglycidyl ether of polyphenol-formaldehyde and the polyamine is triethylenetetraamine, bis(2-aminoethyl)sulfide, polyethyleneimine or 1,6-hexanediamine.

13. The cured reaction product of a polyamine of an aliphatic, alicyclic or aromatic hydrocarbon having three or more reactive functional amino hydrogens and a polyepoxide wherein the molar ratio of the reactants is from about 0.1:1 to about 1.5:1 moles of polyepoxide to moles of polyamine in the form of normally solid, discrete, spheroidal beads.

14. The cured reaction product of claim 13 wherein the polyamine is ethylenediamine, diethylenetriamine, triethylenetetraamine, 1,3-propanediamine, bis(2-aminoethyl)sulfide, 1,6-hexanediamine or polyethyleneimine.

15. The cured reaction product of claim 13 wherein the polyepoxide is an aromatic based epoxide or the polyglycidyl ether of polyphenol-formaldehyde.

16. The cured reaction product of claim 13 wherein the polyamine is diethylenetriamine or triethylenetetraamine and the polyepoxide is the diglycidyl ether of bisphenol A or bisphenol F; or the polyglycidyl ether of polyphenol-formaldehyde.

17. The cured reaction product of claim 13 wherein the reactant ratio of the reactants is from about 0.2:1 to about 0.8:1 epoxy equivalents to amino hydrogen equivalents.

* * * * *

UNITED STATES PATENT AND TRADEMARK OFFICE
CERTIFICATE OF CORRECTION

PATENT NO. : 4,189,539
DATED : February 19, 1980
INVENTOR(S) : Eldon L. Ward

It is certified that error appears in the above-identified patent and that said Letters Patent are hereby corrected as shown below:

Column 2, line 66, delete "ethylencially" and insert --ethylenically--.

Column 3, line 44, delete "bis(4-hydroxyphenyl)pentanoic" and insert --bis(4-hydroxyphenol)pentanoic--.

Column 5, line 6, delete "lithim" and insert --lithium--.

Column 7, line 45, before "diglycidyl" insert --a--;
line 46, before "bisphenol" insert --of--.

Column 8, line 18, delete "exhange " and insert --exchange--.

Column 9, Table I, Example 7, under the heading "Epoxide(1)" delete "PGE 1.2/1 MEK" and insert --PGE P/F MEK--.

Column 9, Table I, Example 10, under the heading "Mole Ratio Epoxide/Amine" delete "0.35/1  27" and insert --0.35/1--.

Column 9, Table I, Example 10, under the heading "Wt. % $H_2O$ of Bead(3)" insert --27--.

Column 9, Table I, in the footnotes, line 6, delete "equivalentweight" and insert --equivalent weight--.

Column 9, Table I, in the footnotes, line 8, delete "equivalentof" and insert --equivalent of--.

Column 9, Table I, in the footnotes, line 12, delete "solutionof" and insert --solution of--.

Column 10, line 59, delete "CMS" and insert --CMC--.

UNITED STATES PATENT AND TRADEMARK OFFICE
CERTIFICATE OF CORRECTION

PATENT NO. : 4,189,539  
DATED : February 19, 1980  
INVENTOR(S) : Eldon L. Ward It is certified that error appears in the above-identified patent and that said Letters Patent are hereby corrected as shown below:

Column 11, line 14 of the footnotes of Table II, delete "percentsolution" and insert --percent solution--.

Column 11, line 48, before "diglycidyl" insert --of--.

Column 12, line 44, delete "polyamide" and insert --polyamine--

Signed and Sealed this

Tenth Day of June 1980

[SEAL]

Attest:

SIDNEY A. DIAMOND

Attesting Officer

Commissioner of Patents and Trademarks